(12) United States Patent
Dupuis et al.

(10) Patent No.: US 6,662,238 B1
(45) Date of Patent: Dec. 9, 2003

(54) INTEGRATED MODEM AND LINE-ISOLATION CIRCUITRY WITH COMMAND MODE AND DATA MODE CONTROL AND ASSOCIATED METHOD

(75) Inventors: Timothy J. Dupuis, Austin, TX (US); Mitchell Reid, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 09/480,726

(22) Filed: Jan. 10, 2000

Related U.S. Application Data (60) Provisional application No. 60/145,475, filed on Jul. 23, 1999.

(51) Int. Cl.$^7$ .................................................. G06F 3/00
(52) U.S. Cl. .............................. 710/1; 710/61; 710/65; 712/229
(58) Field of Search .............................. 710/1, 5, 20, 7, 710/8, 15, 29, 61, 65; 712/225, 221, 220, 229; 375/222; 379/93.05

(56) References Cited

U.S. PATENT DOCUMENTS

| | | | |
|---|---|---|---|
| 4,395,590 A | 7/1983 | Pierce et al. ................. 179/2 |
| 4,417,099 A | 11/1983 | Pierce ............................ 179/2 |
| 5,003,573 A | 3/1991 | Agah et al. | |
| 5,259,003 A | * 11/1993 | Berger et al. ................. 375/38 |
| 5,280,598 A | * 1/1994 | Osaki et al. ................. 395/425 |
| 5,369,666 A | 11/1994 | Folwell et al. ................. 375/8 |
| 5,369,687 A | 11/1994 | Farkas .......................... 379/98 |
| 5,467,385 A | 11/1995 | Reuben et al. | |
| 5,535,242 A | * 7/1996 | Brigida et al. ............... 375/222 |
| 5,602,902 A | 2/1997 | Satterlund et al. | |
| 5,654,984 A | 8/1997 | Hershbarger et al. | |
| 5,655,009 A | 8/1997 | Arai et al. | |
| 5,655,010 A | 8/1997 | Bingel ..................... 379/93.28 |
| 5,687,194 A | 11/1997 | Paneth et al. | |
| 5,790,656 A | 8/1998 | Rahamim et al. | |
| 5,870,046 A | 2/1999 | Scott et al. ................. 341/143 |
| 6,005,923 A | 12/1999 | Lee .......................... 379/93.09 |
| 6,081,586 A | 6/2000 | Rahamim et al. | |
| 6,169,762 B1 | 1/2001 | Embree et al. | |
| 6,198,816 B1 | 3/2001 | Hein et al. | |
| 6,212,272 B1 | 4/2001 | Herschler et al. | |
| 6,298,133 B1 | 10/2001 | Hein et al. | |
| 6,304,597 B1 | * 10/2001 | Dupuis et al. .............. 375/222 |
| 6,351,530 B1 | * 2/2002 | Rahamim et al. ....... 379/399.01 |
| 6,359,973 B1 | 3/2002 | Rahamim et al. | |
| 6,389,063 B1 | 5/2002 | Kanekawa et al. ......... 375/222 |

FOREIGN PATENT DOCUMENTS

| | | |
|---|---|---|
| EP | 0 881 805 A2 | 12/1998 |
| EP | 0 973 305 A1 | 1/2001 |
| WO | WO98/44687 | 10/1998 |

OTHER PUBLICATIONS

International Search Report dated Oct. 19, 2000.
Kojima, Y. et al., A Novel Monolithic Isolator for a Communications Network Interface IC: The 9$^{th}$ Annual IEEE Int'l ASIC Conf., pp. 255–258 (1998).
Silicon Systems, *SSI 73D2950/2950T Low Power Fax/Data Modem Chip Set Advance Information*, pp. 4–75—4–105, Dec. 1993.
Krypton, "*K$^2$930G Functional and Electrical Descriptions*", 10 pages (1997).
Information Sheet—Siemens, *DAA2000 Optical DAA Kit—Preliminary*, pp. 1–21; Jun. 13, 1997.

(List continued on next page.)

Primary Examiner—Jeffrey Gaffin
Assistant Examiner—Rijue Mai
(74) Attorney, Agent, or Firm—O'Keefe, Egan & Peterman, LLP (57) ABSTRACT

An improved modem architecture and associated method are disclosed that integrate modem functionality and line-side isolation functionality while also providing a modem interface that allows command and data mode control.

18 Claims, 10 Drawing Sheets

OTHER PUBLICATIONS

Siemens Press Release, *Siemens Pioneers Programmable Front End For Analog Modems Single Design For Worldwide Standards*, Aug. 6, 1997.

Information Sheet—Siemens, *ICs for Communications, ALIS Reference Board, SIPB 4595 Version 1.0, Technical Description 06.97, Q67220–H1014*, Jun. 1997.

Information Sheet—Siemens, *ICs for Communications, ALIS Evaluation Board, SIPB 45900 Version 1.1, Technical Description 06.97*, Q67220–H1047, Jun. 1997.

Data Sheet SmartMC™ Modem Codec, *Host–Processed, V.90/K56flex™ Modem Codec (MC) Device Set with SmartDAA™ Technology for AC–link (AC'97 2.1) Applications*, Mar. 1999.

Rockwell Semiconductor Systems, *RC96V24DP, Single Device Data/Fax Modem Data Pump*, Sep. 1998.

CP Clare *CPC2400 Preliminary Specifications*, Oct. 1998.

TDK Semiconductor Corp., *73K224BL V.22bis/V.22/V.21/ Bell 212A/103 Single–Chip Modem w/Integrated Hybrid*, Nov. 1997.

Zilog *Preliminary Product Spefication DS97FMO0201 Z02201 V.22bis Modem Data Pump with Integrated AFE*, 1998.

Silicon Laboratories, *Si3032 Direct Digital Access Arrangement (DDAA)*, Nov. 1997.

* cited by examiner

INTEGRATED MODEM AND LINE-ISOLATION CIRCUITRY WITH COMMAND MODE AND DATA MODE CONTROL AND ASSOCIATED METHOD

This application claims priority from Provisional Application Serial No. 60/145,475 to Timothy J. Dupuis, Andrew W. Krone and Mitchell Reid, which was filed Jul. 23, 1999, and is entitled "POWERED SIDE DAA CIRCUIT HAVING MODEM CIRCUITRY."

TECHNICAL FIELD OF THE INVENTION

This invention relates to modem architecture for communication lines. More particularly, this invention relates to modem circuitry used in connection with isolation systems for connecting to phone lines.

BACKGROUND

New generations of consumer appliances like set-top boxes, payphones, vending machines and other systems often require or prefer low-speed data modems. Such modems allow remote hosts to handle billing or other housekeeping functions, or permit "smart" vending machines to call for more supplies. Although typical microprocessor and digital-signal-processor (DSP)-based multimedia chips employed in set-top boxes and other systems are capable of implementing a low-speed modem, they would do so at an undesirable manufacturing complexity and expense.

Prior modem architectures typically included multiple integrated circuits for handling modem processing and communication line termination. In particular, one or more digital-signal-processor chips have been coupled to analog-front-end circuitry, which in turn has been connected to line termination circuitry across a transformer isolation barrier. Such modem architectures suffer from numerous disadvantages.

SUMMARY OF THE INVENTION

The present invention provides an improved modem architecture and associated method that integrate modem functionality and line-side isolation functionality while also providing a modem interface that allows command and data mode control.

In one embodiment, the present invention is an integrated modem and line-isolation circuit with modem command mode and data mode control including system-side line-isolation circuitry capable of being coupled to an isolation barrier, digital signal processing (DSP) circuitry integrated with the system-side line-isolation circuitry, the DSP circuitry having a modem processor for modem data and a digital processor for system-side circuitry; and a serial input pin that receives an M-bit word, wherein M-minus-N bits of the M-bit word are data bits and N-bits of the M-bit word are control bits. The control bits serve to identify whether the modem processor should process the M-bit word in command mode or in data mode. In a more particular embodiment, the M-bit word may be a 9-bit word with 8 bits being for data and 1-bit being for control, and this single control bit may be the last bit of the 9-bit word received through the serial input pin. In addition, the serial input pin may receive a start bit before receiving the M-bit word and a stop bit after receiving the M-bit word. Still further, the digital processor may include digital filters for digital data received across the isolation barrier from the communication line and a digital modulator for digital data transmitted across the isolation barrier to the communication line. Furthermore, the system-side line-isolation circuitry may provide system-side phone line direct access arrangement functionality.

In another embodiment, the present invention is a method for controlling whether modem circuitry within an integrated modem and line-isolation circuit operates in command mode or data mode including receiving an M-bit word through a serial input pin, utilizing N-bits of the M-bit word as control bits, and determining whether the modem circuitry operates in command mode or data mode based upon the state of the N control bits. In a more particular embodiment, the M-bit word may be a 9-bit word with 8 bits being for data and 1-bit being for control. Still further, the serial input pin may be part of an asynchronous serial interface.

In a further embodiment, the present invention is a method for providing modem command mode and data mode control for a modem and line-isolation integrated circuit including providing a system-side line-isolation integrated circuit including digital-signal-processing (DSP) circuitry having a modem processor for modem data and a digital processor for system-side circuitry, providing a serial input pin for the system-side line-isolation integrated circuit, receiving an M-bit word through the serial input pin, utilizing N-bits of the M-bit word as control bits, and determining whether the modem processor operates in command mode or data mode based upon the state of the N control bits. In a more particular embodiment, the method may also include communicating digital information through an isolation barrier between the system-side line-isolation integrated circuit and a line-side line-isolation integrated circuit.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Figure 1A:
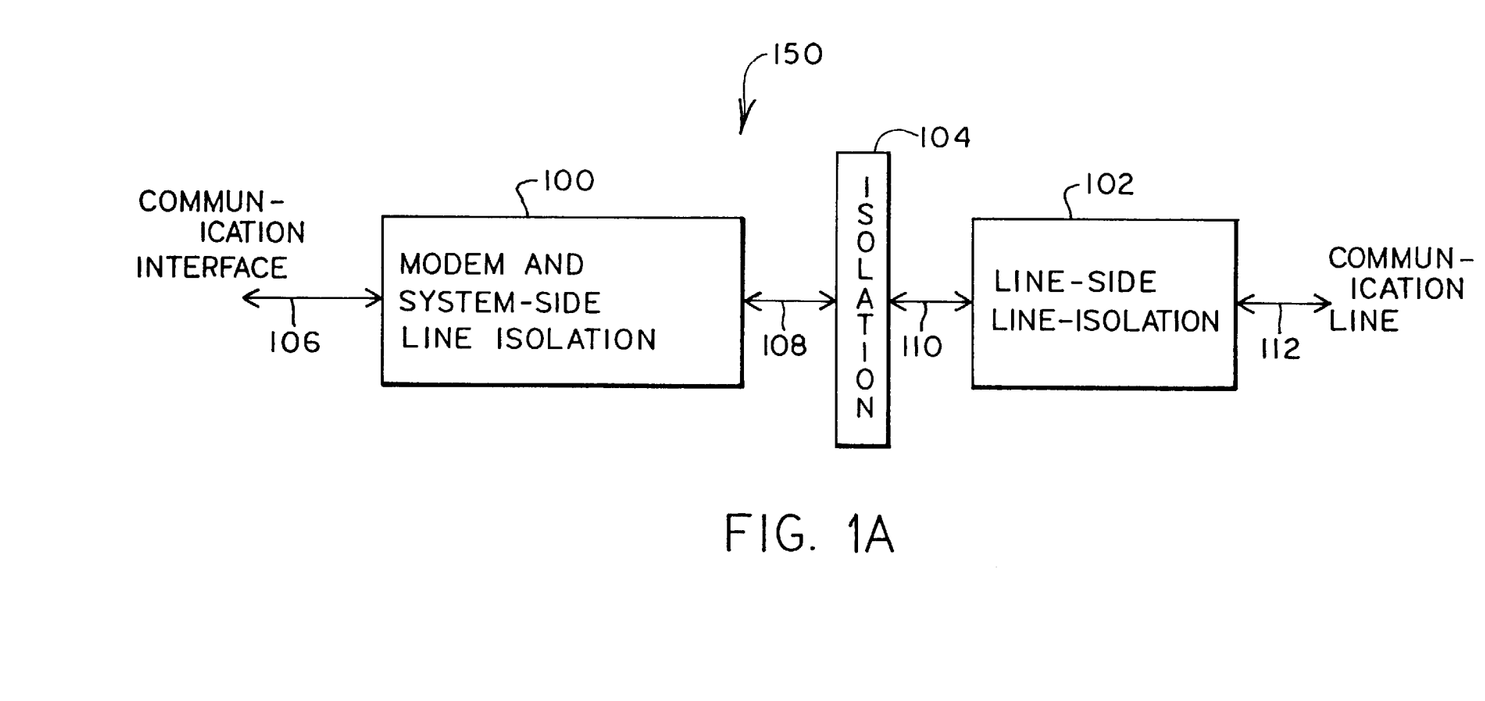
FIG. 1A is a block diagram of an embodiment for a combined modem and line-isolation system according to the present invention.

FIG. 1A is a block diagram of an embodiment for a combined modem and line-isolation system 150 according to the present invention. This combined modem and line-isolation system 150 includes a system-side line-isolation integrated circuit (IC) 100 and a line-side line-isolation integrated circuit (IC) 102. In the embodiment shown, the system-side line-isolation IC 100 includes integrated modem circuitry and circuitry providing system-side direct access arrangement (DAA) functionality. In the embodiment shown, the line-side line-isolation IC 102 includes circuitry providing line-side DAA functionality. The system-side line-isolation IC 100 communicates to external circuitry through the communication interface 106. The line-side line-isolation IC 102 communicates to the communication line through interface 112. It is noted that the communication line may be a desired medium and may be, for example, a telephone line.

The system-side line-isolation IC 100 and the line-side line-isolation IC 102 communicate digital information across an isolation barrier 104 through line interfaces 108 and 110, respectively. The isolation barrier 104 may be a capacitively isolated barrier, including one or more capacitors, and may also include a transformer or other isolation device, as desired. In addition, line-isolation systems and associated capacitively isolated barriers are disclosed in U.S. Pat. No. 5,870,046 entitled "Analog Isolation System with Digital Communication Across a Capacitive Barrier," and U.S. patent application Ser. No. 09/035,175 entitled "Direct Digital Access Arrangement Circuitry and Method for Connecting to Phone Lines," which are both hereby incorporated by reference in their entirety.

The present invention provides a single integrated circuit solution for a modem and system-side line-isolation circuitry. The modem digital-signal-processing (DSP) functionality has been combined with the system-side line-isolation DSP functionality to provide a DSP engine capable of handling, for example, both digital filter processing needed for phone line DAA functionality and modem processing needed for processing modem algorithms. This architecture achieves numerous advantages, including: (1) improved power savings by allowing the line-side line-isolation IC to be powered at least in part from the communication line, (2) improved DAA programmability by having a programmable device on the system side of the isolation barrier 104, (3) improved manufacturing and design capabilities by having a digital system-side chip 100 separate from the mixed signal line-side chip 102, and (4) improved DSP efficiency by using a single DSP engine to process both modem algorithms and required digital filters for the analog-front-end circuitry.

A wide range of interface protocols may be utilized to communicate over the external interface 106, including, for example, modem standards, such as V0.22 bis (QAM), V0.22/Bell 212A 1200 bit/s (DPSK), V0.21/Bell 103 300 bit/s (FSK), V0.23/Bell 1200 bit/s V0.23 with data flow reversing, and V0.25-based fast connect. In addition, the modem interface 106 can handle the Security Industry Association's generic digital communication standard, as well as other alarm protocols. The interface 106 may also be, for example, an asynchronous serial interface. If desired, the interface 106 may also be designed as a synchronous serial interface, an asynchronous parallel interface, a synchronous parallel interface, or any other desired interface.

Figure 1B:
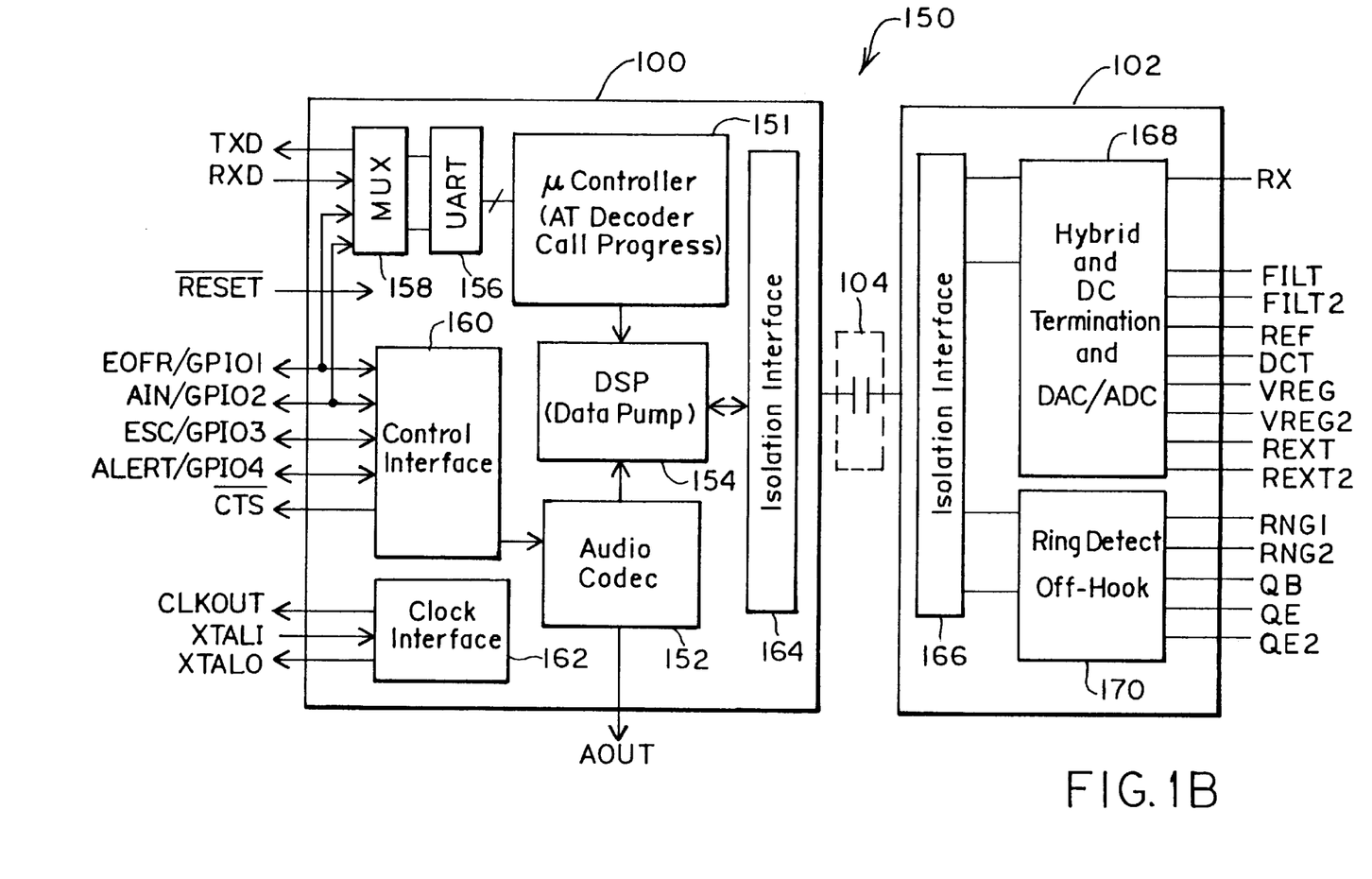
FIG. 1B is a more detailed block diagram of an embodiment, including an example pin-out configuration, for the combined modem and line-isolation system according to the present invention.

FIG. 1B is a more detailed block diagram of an embodiment for combined modem and line isolation system 150 according to the present invention. The isolation barrier 104 is a capacitively isolated barrier that is connected between external pins of the system-side line-isolation IC 100 and the line-side line-isolation IC 102.

The system-side line-isolation IC 100 includes an isolation interface 164, a digital-signal-processor (DSP) 154, a microcontroller 151, an audio CODEC (COder-DECoder) 152, a clock interface 162, a control interface 160, a UART (Universal Asynchronous Receiver Transmitter) processor 156, and a multiplexer (MUX) 158. The UART processor 156 operates to convert parallel bytes from the microcontroller 151 into serial bits for transmission to and receipt from an external device through the transmit pin TXD and receive pin RXD, respectively. For example, the UART may operate in an 8-bit word format or a 9-bit word format for serial data transmission through the transmit pin TXD and/or the receive pin RXD.

The DSP 154 provides data pump functionality and may be, for example, a 14-bit DSP that performs data pump functions. The microcontroller 151 provides AT command decoding and call progress monitoring and may employ, for example, a 4-bit program word and an 8-bit data word. The clock interface 162 includes a clock generator that accepts a high-frequency (e.g., 4.9152-MHz) master clock input. It also generates all the modem sample rates for supporting the modem standards designed into the system-side line-isolation IC. In addition, the generator provides a 9.6 kHz rate for audio playback.

Pins for the system-side line-isolation IC 100 may include the transmit pin TXD, the receive pin RXD, the reset pin RESET_, the clear-to-send pin CTS_, the clock output pin CLKOUT, crystal oscillator pins XTALI and XTALO, and the analog output pin AOUT. Four other pins may be general purpose programmable input/output pins GPIO1, GPIO2, GPIO3, and GPIO4. Each of these pins may be set up as analog in, digital in, or digital out pins, depending upon user programming of pin functionality. In particular, the GPIO1 pin may also function as the end of frame pin EOFR for HDLC framing. The GPIO2 pin may provide an analog in pin AIN. The GPIO3 pin may function as an escape pin ESC for controlling command or data modes. And the GPIO4 pin may function as the alert pin ALERT for signaling events such as an intrusion event. Programming and control of the system-side line-isolation IC 100 may be accomplished by sending appropriate commands through the serial interface. For example, commands may be sent by an external integrated circuit that load internal registers within the system-side line-isolation IC 100 that control the operation and functionality of the system-side line-isolation IC 100.

Line-side line-isolation IC 102 includes an isolation interface 166, ring detect and off-hook circuitry 170, and circuitry 168 that includes hybrid and DC termination circuitry as well as analog-to-digital converter (ADC) and digital-toanalog converter (DAC) circuitry. Pins for the line-side line-isolation IC may include a receive input pin RX, filter pins FILT and FILT2 that may set the time constant for the DC termination circuit, a reference pin REF that may connect to an external resistor to provide a high accuracy reference current, a DC termination pin DCT that may provide DC termination for the phone line and an input for voltage monitors, voltage regulation pins VREG and VREG2 that may connect to external capacitors and provide a bypass for an internal power supply, external resistor pins REXT and REXT2 that may provide real and complex AC termination, ring pins RNG1 and RNG2 that may connect through capacitors to "tip" and "ring" to provide ring and caller ID signals across the barrier 104, and transistor connection pins QB, QE and QE2 that may connect to external bipolar hook-switch transistors.

It is noted that the underscore suffix "_" added to pin signals above indicate signals that are active low. It is noted that the active high or active low indications for the external pins of the system-side line-isolation IC 100 and the line-side line-isolation IC 102 are a design choice that may be changed if desired.

Figure 2A:
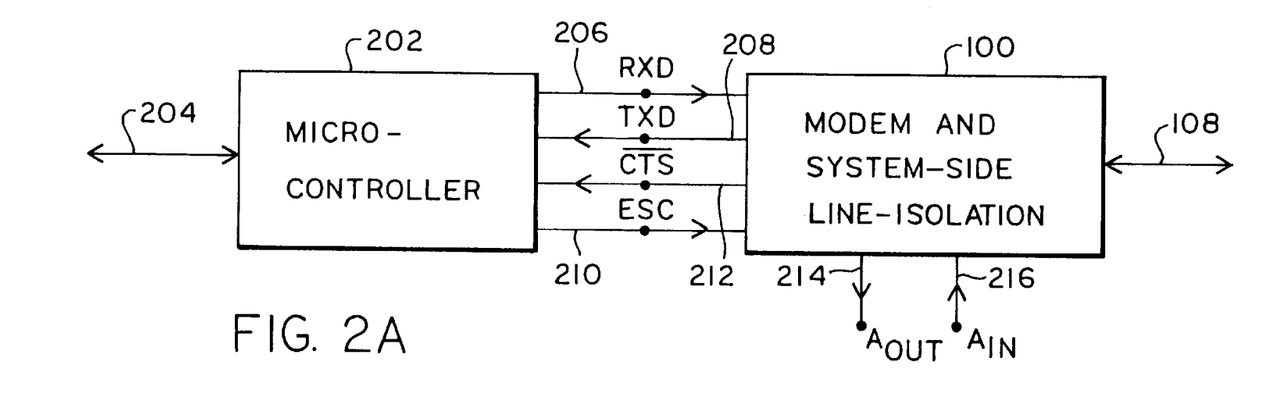
FIG. 2A is an example block diagram of an external device connecting to the system-side line-isolation integrated circuit of the line-isolation system according to the present invention.

FIG. 2A is an example block diagram 200 of an external device connected to the system-side line-isolation IC 100 portion of isolation system 150 according to the present invention. In particular, FIG. 2A shows an external microcontroller 202 connected to the system-side line-isolation IC 100. The interface 108 to the isolation barrier 104 is connected to the system-side line-isolation IC 100, and an external communication interface 204 is connected to the microcontroller 202. Also shown in FIG. 2A are the receive pin RXD connections 206, the transmit pin TXD connections 208, the clear-to-send pin CTS_ connections 212, and the escape pin ESC connections 210. In addition, there is an analog in AIN connection 216 and an analog out AOUT connection 214 coupled to the system-side line-isolation IC 100. It is noted that the microcontroller and/or the system-side line-isolation IC may be connected to other communication lines or buses, for example, to an RS-232 bus through appropriate drive circuitry.

The escape pin ESC 210 allows for rapid control of whether the system-side line-isolation IC 100 is in command or data mode. This escape pin ESC provides a technique for telling the system-side line-isolation IC 100 whether to interpret incoming signals as data or commands. For example, if the microcontroller 202 applies a high logic level to the ESC pin, the modem circuitry within the system-side line-isolation IC 100 knows that the incoming information is a command. Conversely, if the microcontroller 202 applies a low logic level to the ESC pin, the modem circuitry within the system-side line-isolation IC 100 knows that the incoming information is data. It is noted that these high and low logic levels could be reversed, as desired.

Alternatively, if the UART is operating in a 9-bit word format, one bit of a 9-bit sequence received by the system-side line-isolation IC 100 may be used to identify data mode or command mode. For example, standard modem control may use an 8-bit word format for serial data stream communication. If the modem data pump that is part of the DSP 154 is set to operate at 8-bits and the UART 156 is set to operate at 9-bits, the extra bit applied to the UART 156 may be utilized to identify whether the data input should be treated as data or a command. For example, if the extra bit is a low logic level, the modem circuitry within the system-side line-isolation IC 100 knows that the incoming information is a command. Conversely, if the extra bit is a high logic level, the modem circuitry within the system-side line-isolation IC 100 knows that the incoming information is data. It is noted that these high and low logic levels could be reversed, as desired.

Figure 2B:
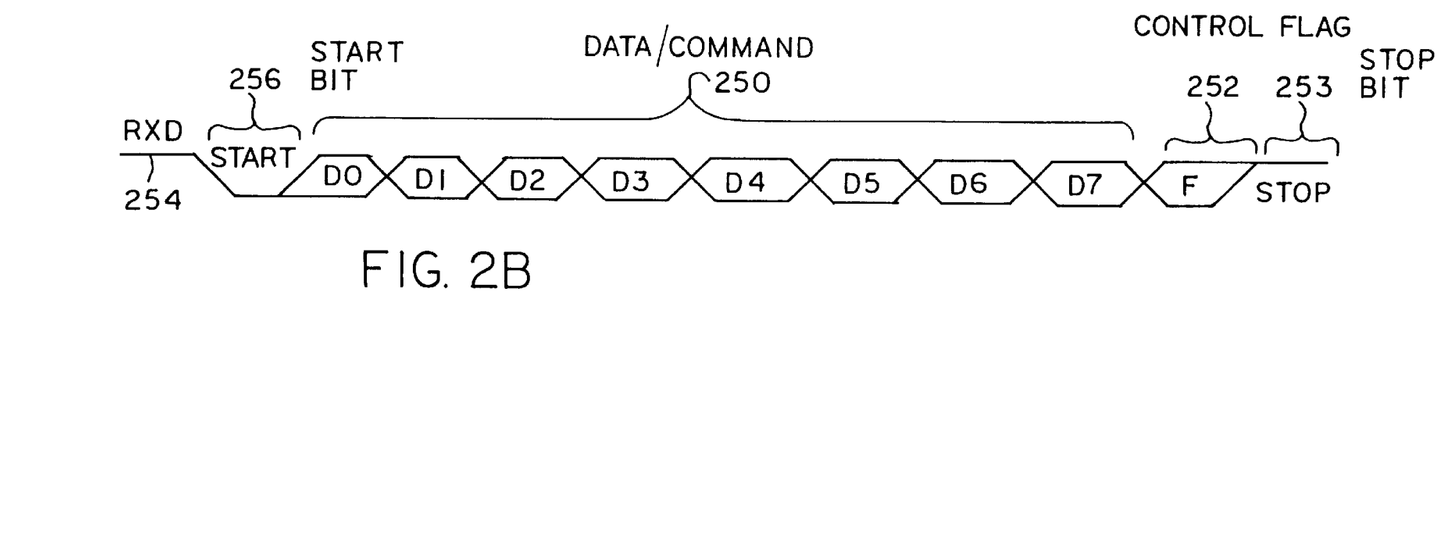
FIG. 2B is a diagram of a 9-bit communication sequence that may be used to control when the modem circuitry within the system-side line-isolation integrated circuit is in command mode or data mode.

An embodiment for this 9-bit control timing is shown with respect to FIG. 2B for information on the receive RXD lines 254. This timing includes a START bit 256, which is a low logic level for the embodiment in FIG. 2B, and a STOP bit 253, which is a high logic level for the embodiment in FIG. 2B. The logic levels for the START bit 256 and the STOP bit 253 may be selected as desired. As shown in FIG. 2B, the $9^{th}$ bit in the sequence may be used as a control flag bit (F) 252 to identify command mode or data mode, with command mode being a logic "1" and data mode being a logic "0", or vice versa. The other 8-bits (D0, D1, D2, D3, D4, D5, D6 and D7) may be the data or command information 250. Thus, the external microcontroller 202 may identify each set of 8-bits of serial data as command data or modem data, depending upon how the $9^{th}$ bit is set. This information is sent through the RXD pin 206 or the TXD pin 208, for example, by a microcontroller, such as an 8051 microcontroller utilizing an 8-bit data mode. It is noted that the control flag bit may be one of the other bits in the sequence, as desired. It is also noted that the numbers of data bits and the number of control bits may be selected as desired so that N bits of an M-bit word may be used as control bits and M-N bits of an M-bit word may be used as data bits.

In the combined modem and line-isolation system of the present invention, incoming data is digitized within the line-side line-isolation IC 102 on the line-side of the isolation barrier 104. This digital data is then sent across the isolation barrier 104 to the system-side line-isolation IC 100. In turn, data coming from an external device is processed by the system-side line-isolation IC 100 and sent across the isolation barrier 104 as digital information. It is then converted to an analog signal by the line-side line-isolation IC 102. To allow for voice mode applications with the primarily digital processing provided in the system-side line-isolation IC 100, the present invention includes an audio CODEC 152 in the system-side line-isolation IC 100. With this architecture, the present invention provides a single chip solution that combines modem functionality with voice band functionality, so that the user may select either a modem operational mode or a voice operational mode.

Figure 3A:
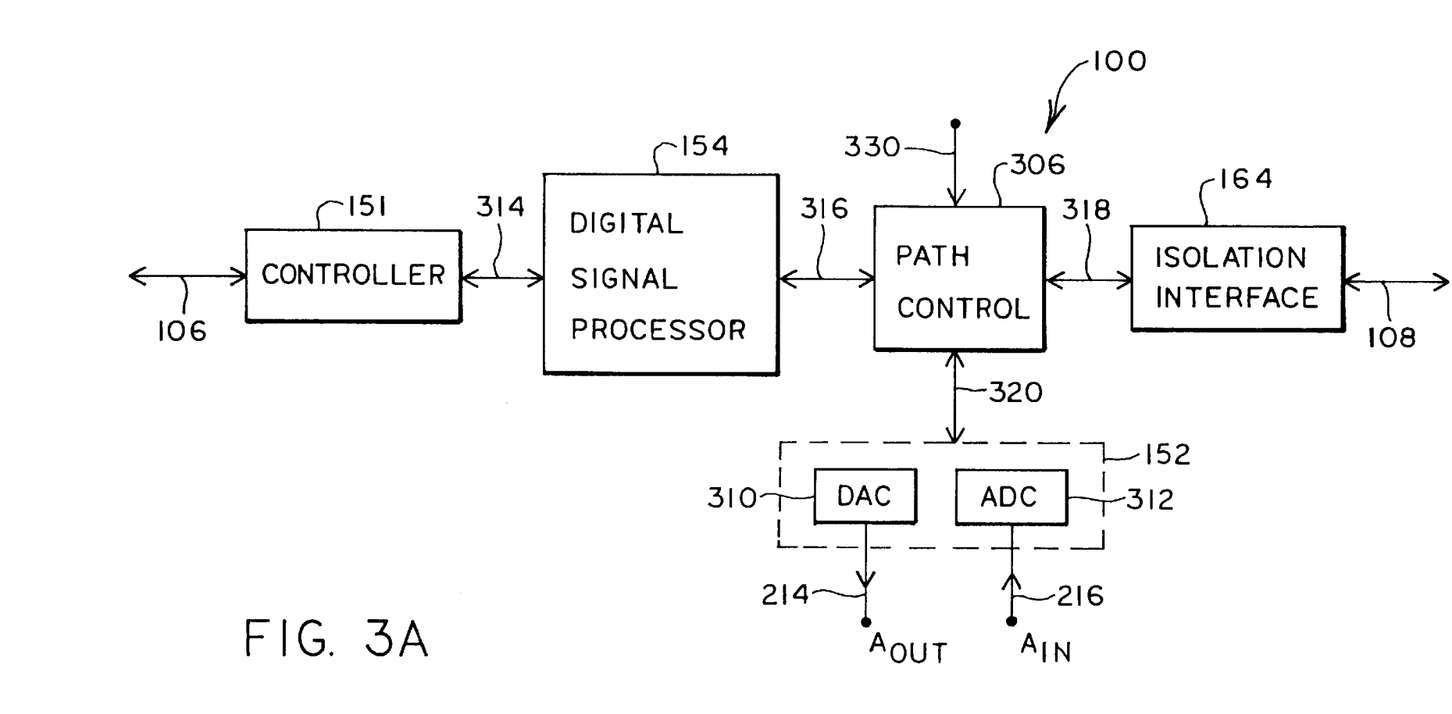
FIG. 3A is a block diagram of an embodiment with path control circuitry for the system-side line-isolation integrated circuit of the line isolation system according to the present invention.

FIG. 3A is a block diagram of an embodiment for the system-side line-isolation IC 100 of a combined modem and line isolation system 150 according to the present invention. A controller 151 receives and transmits information through interface 106. The controller 151 communicates with the digital-signal-processor (DSP) 154 through interface 314. The isolation interface 164 controls communication across the isolation barrier 104 through interface 108. The analog in AIN connection 216 and the analog out AOUT connection 214 connect to an analog-to-digital converter (ADC) 312 and a digital-to-analog converter (DAC) 310, respectively. The ADC 312 and the DAC 310 are part of the audio CODEC 152. Furthermore, the DSP circuitry 154 may be used to provide DTMF (dual-tone multi-frequency) decoding and tone generation so that the system-side line-isolation IC 100 may provide DTMF tone generation functionality and DTMF tone detection functionality. In the embodiment shown, for example, DTMF tones may be received from the communication line 112 through interface 108 or from the analog in AIN connection 216. DTMF tones may be transmitted to the communication line 112 through interface 108 or to the analog out AOUT connection 214.

Path control circuitry 306 is controlled by a control signal 330 that may be programmed by the user. The DSP 154 communicates with the path control circuitry 306 through interface 316. The DAC 310 and the ADC 312 communicate with the path control circuitry 306 through interface 320. The isolation interface 164 communicates with the path control circuitry 306 through interface 318. The path control circuitry 306 may be, for example, a plurality of switches controlled by the control signal 330 so that the desired data flow is achieved. The control signal 330 may be, for example, a multiple bit signal provided by a programmable control register that determines whether each of the plurality of switches is "on" or "off." This programmable control register may be loaded by sending commands through the serial interface to load the control register with the desired control signal.

By controlling the path control circuitry 306, the flow of data within the system-side line-isolation IC 100 may be controlled as desired. For example, data from interface 106 may be output directly through the analog out AOUT connection 214, may be output to the line-side line-isolation IC 102 through the isolation interface 164, or may be output back from the DSP 154 to the interface 106. Data from the analog in AIN connection 216 may be output back through the analog out AOUT connection 214, may be output to the line-side line-isolation IC 102 through the isolation interface 164, and may be output through the DSP 154 to the interface 106. Data from the line-side line-isolation IC 102 across the interface 108 may be output through the DSP 154 to the interface 106, or may be output through the analog out AOUT connection 214.

FIGS. 3B–3E are block diagrams of embodiments for data flow and processing paths that may be selected through the path control circuitry 306 of FIG. 3A. It is noted that other data flow and process paths could be provided, as desired.

Figure 3B:
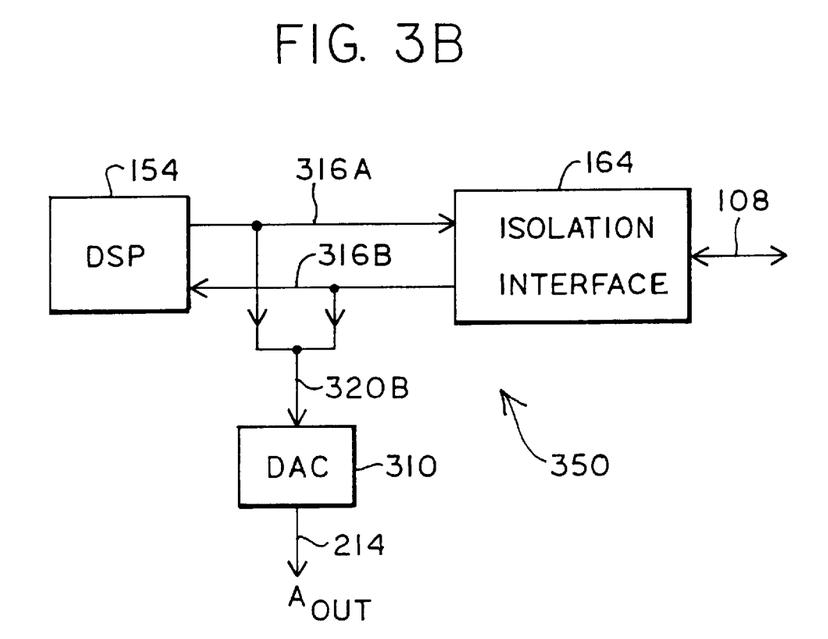
FIGS. 3B–3E are block diagrams of example embodiments for data flow and processing paths that may be selected through the path control circuitry of FIG. 3A.

FIG. 3B is a block diagram of an embodiment 350 in which data mode operations are desired. The output 316A and the input 316B of the DSP circuitry 154 are connected to the isolation interface 164 and are also combined to provide an input 320B to the DAC 310. The analog out AOUT 214, therefore, is a combination of the DSP input signal 316B and the DSP output signal 316A. This mixed sum may be used for call progress monitoring through an external speaker. In addition, the relative levels of the DSP input and output signals 316A and 316B may be programmed through the interface 106.

Figure 3C:
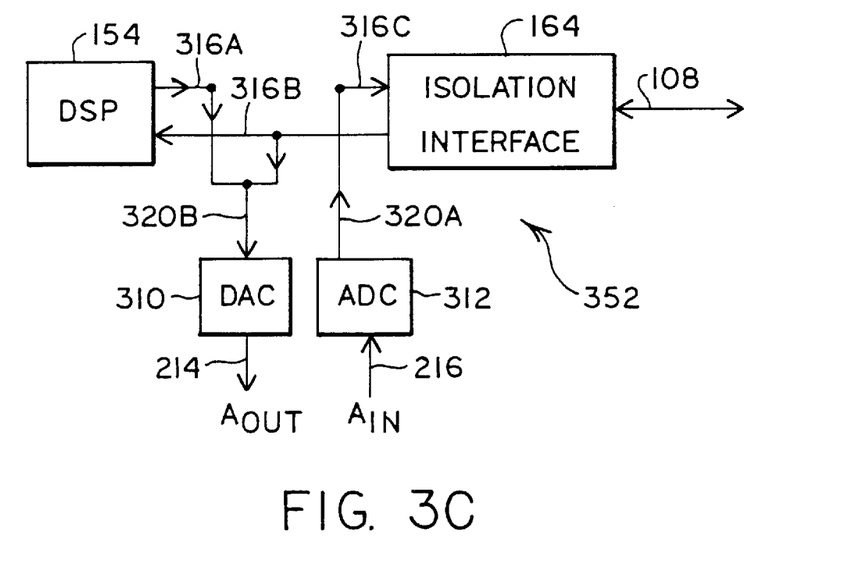

FIG. 3C is a block diagram of an embodiment 352 in which voice mode operations are desired. The input 316B to the DSP circuitry 154 is connected to the isolation interface 164. The output 316A of the DSP circuitry 154 is combined with the DSP input 316B to provide an input 320B to the DAC 310. The analog out AOUT 214, therefore, is a combination of the DSP input signal 316B and the DSP output signal 316A. The ADC 312 takes the analog in AIN 216 and provides a digital signal 320A for the isolation interface input 316C. In this configuration for path control circuitry 306, the analog out AOUT 214 provides a voice output, and the analog in AIN 216 provides a voice input. In addition, the DSP circuitry 154 may process these signals, if the modem processor 404 of FIG. 4 is not being bypassed for PCM data mode.

For this voice mode of operation embodiment of FIG. 3C, voice information may be received through the analog in AIN connection 216, processed by the ADC 312 and sent across the isolation barrier 104. Looking to FIG. 5, it is seen that the DAC 504 may convert the digital voice information produced by ADC 310 for transmission to the communication line interface 112. Also in voice mode, incoming voice signals from the communication line interface 112 may be converted to digital information by ADC 506 and sent across the isolation barrier 104. The DAC 310 may then convert this digital voice information back to analog voice information and output it through the analog out AOUT connection 214.

Figure 3D:
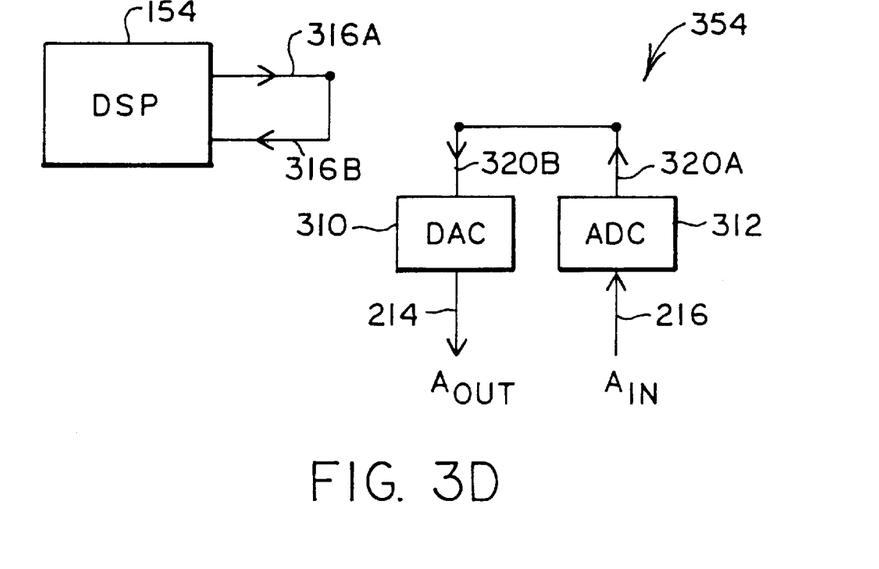

FIG. 3D is a block diagram of an embodiment 354 in which test mode operations are desired. In this configuration for the path control circuitry 306, the DSP output signal 316A and the DSP input signal 316B are connected together. These connections allow for the DSP circuitry to be more easily tested through the external interface 106. Similarly, the output 320A of the ADC 312 and the input 320B of the DAC 310 are connected together. These connections allow for the voice CODEC 152 to be more easily tested.

Figure 3E:
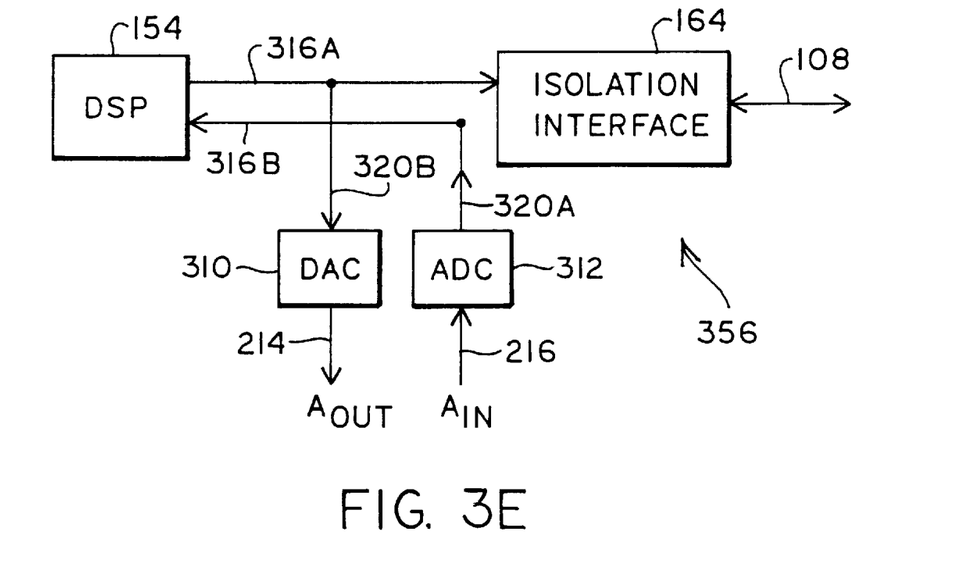

FIG. 3E is a block diagram of an embodiment 356 in which a CODEC mode of operation is desired. The DSP output signal 316A is connected to the isolation interface 164 and to the input 320B to the DAC 310. The analog out AOUT 214, therefore, is based upon the DSP output signal 316A. The ADC 312 converts the analog in AIN 216 and provides signal 320A as the DSP input signal 316B. This operational mode is helpful, for example, in voice prompting and speaker phones, and provides a stand-alone voice CODEC feature that may be accessed through the external interface 106. Thus, an on-chip voice CODEC 152 provides an optional analog input and output to the chip. Although the DAC 310 is connected to the analog out AOUT pin 214, it is noted that the analog in AIN pin may be selected from among the general purpose input/output pins GPIO1–4. The CODEC 152 also allows analog voice information to be sent across the isolation barrier 104 to the line-side line-isolation IC 102 and then to the telephone line.

In short, programmable path control circuitry 306 provides the ability for an external device to determine the data processing and data flow through the system-side line-isolation IC 100, as desired.

Figure 4A:
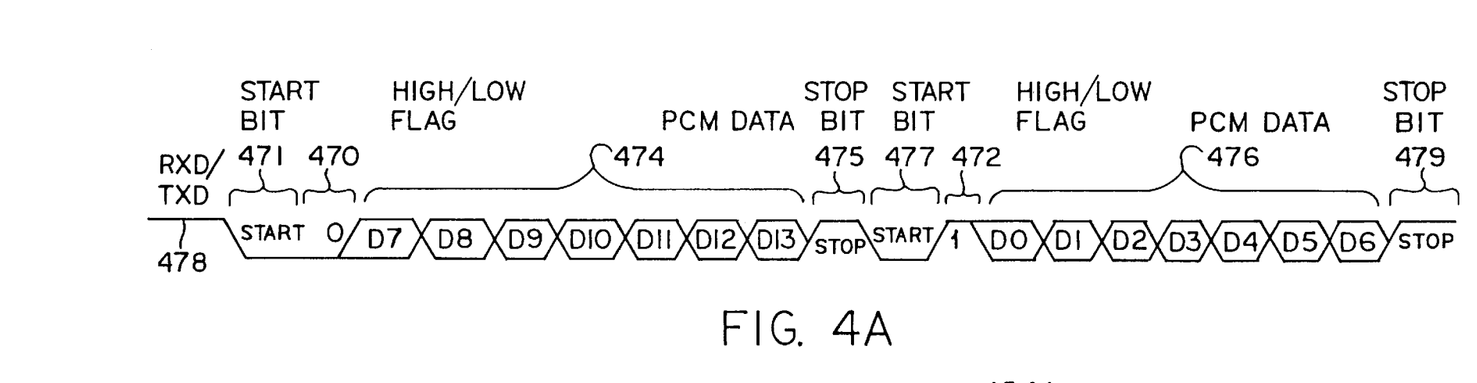
FIG. 4A is a diagram of a communication sequence that may be utilized to transmit raw data to and from the system-side line-isolation integrated circuit.

FIG. 4A is a diagram of a communication timing sequence that may be utilized to transmit raw data, such as pulse-code-modulated (PCM) data, to and from the system-side line-isolation IC 100. The line 478 represents the receive RXD or transmit TXD pins through which the information may be sent or received. This timing includes START bits 471 and 477, which are low logic levels for the embodiment in FIG. 4A, and STOP bits 475 and 479, which are high logic levels for the embodiment in FIG. 4A. The logic levels for the START bits 471, 477 and the STOP bits 475, 479 may be selected as desired. It is noted that PCM data may be used to represent voice information over phone lines.

In the embodiment shown, the raw PCM data has been designed to be 14-bit data (D0, D1, D2, D3, D4, D5, D6, D7, D8, D9, D10, D11, D12, and D13). This 14-bit data is represented by PCM data bits (D7–D13) 474 and PCM data bits (D0–D6) 476. These two sets of 7-bits of data may be sent to and from the DSP circuitry 154A and 154B in two 8-bit words. The first bits 470 and 472 of each 8-bit word are high/low byte flags. Thus, in the example shown in FIG. 4A, the low byte is indicated by a logic "0" in the first bit 470 of the first 8-bit word. The high byte is indicated by a logic "1" in the first bit 472 of the second 8-bit word. It is noted that these logic levels could be reversed if desired so that a logic "1" represented the low byte and a logic "0" represented the high byte. In addition, the high data word 476 and the low data word 474 may be switched, if desired.

It is also noted that the 14-bit PCM data sample size is a design feature that may be modified as desired. In addition to the number of data bits, the number of data words and the number of flag bits may be adjusted as desired. For example, if more than two data words are utilized, a plurality of flag bits may be used for each data word to identify the order in which the data should be interpreted. Furthermore, the flag bits could be eliminated if the external device were designed to assume the order of the data words. Similarly, the start and stop bits could be eliminated if desired. Still further, a plurality of serial input pins or a plurality of serial output pins could be utilized so that the PCM data could be separated into multiple words and then be transmitted through the plurality of serial input/output pins at the same time. For example, for 14-bit PCM data, a 7-bit PCM data word could be sent or received through a first serial input/output pin at the same time a second 7-bit PCM data word was sent or received through a second serial input/output pin. It is recognized, therefore, that the data transfer protocol, including the number of pins utilized, may be modified as desired without departing from the present invention.

Using this technique, for example, an asynchronous interface may be used to send and receive raw PCM voice data. To provide this PCM voice data for a 9.6 kHz sample rate and 16-bit samples, a 192 kHz baud rate or greater is required through the interface 106 between the external device 202 and the system-side line-isolation IC 100.

To enter the raw data mode, the system-side line-isolation IC 100 may be given a command so that the modem processing provided by modem processor 404 is bypassed. Thus, raw data is sent and received through the interface 106. For data transmission of raw data from the system-side line-isolation IC 100 to the external microcontroller 202, the external microcontroller 202 may be assumed to have the speed to handle the data without need for a control signal. For data transmission of raw data from the external microcontroller 202 to the system-side line-isolation IC 100, the clear-to-send CTS_pin 212 may be used to tell the external microcontroller when the system-side line-isolation IC 100 is ready for more data. It is noted that the protocol utilized for PCM data transfer may be designed and operated as desired.

By providing a technique for transmission of raw data, such as PCM data, the present invention accomplishes an advantageously simple interface for embedded modems with voice features.

Figure 4B:
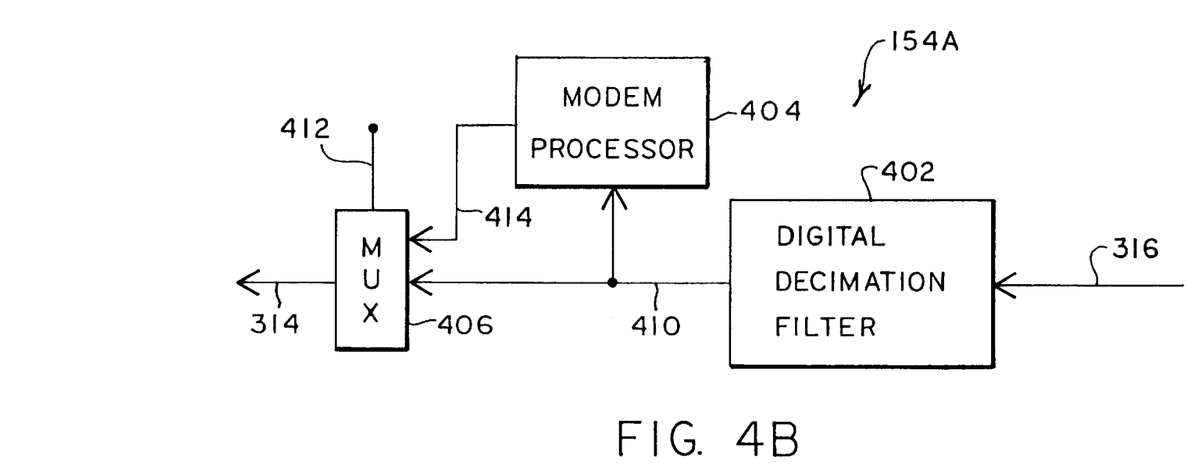
FIG. 4B is a block diagram for the receive path digital-signal-processor (DSP) circuitry for the system-side line-isolation integrated circuit of a line isolation system according to the present invention.
Figure 4C:
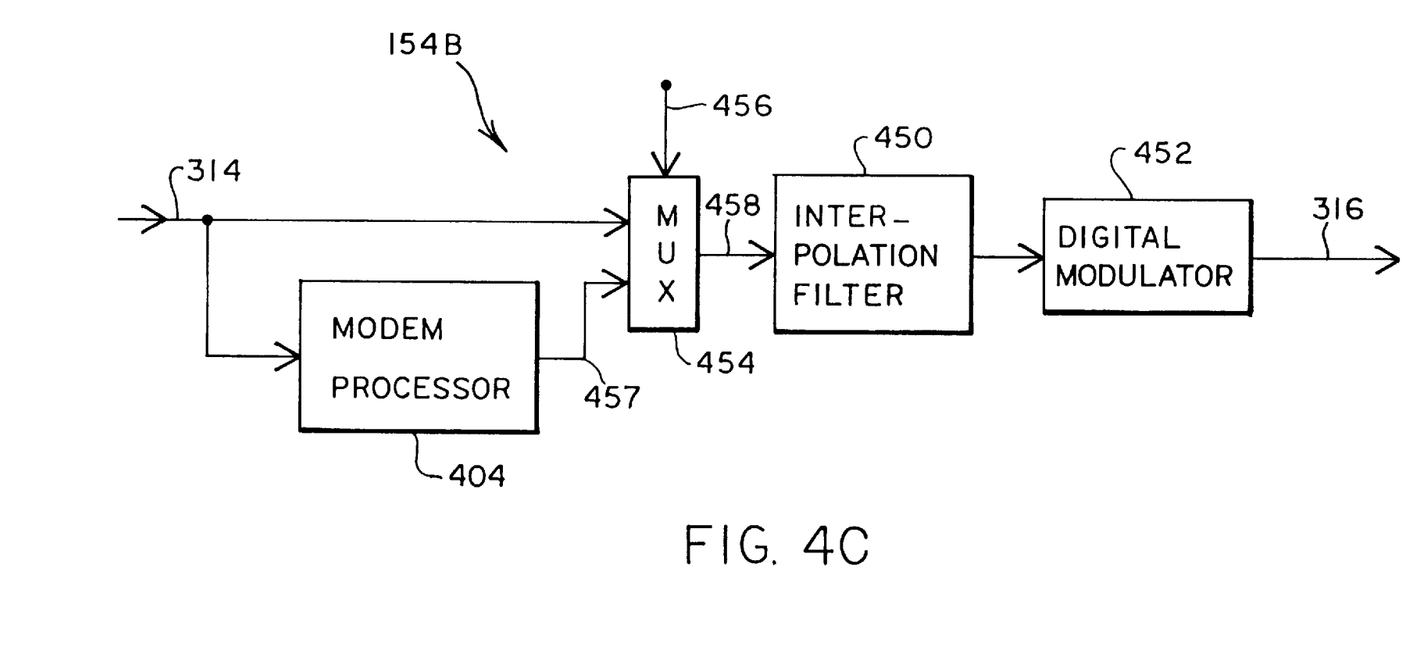
FIG. 4C is a block diagram for the transmit path DSP circuitry for the system-side line-isolation integrated circuit of a line isolation system according to the present invention.

FIG. 4B and FIG. 4C depict block diagrams of DSP circuitry 154A and 154B, respectively, for bypassing modem processor 404, if desired.

FIG. 4B is a block diagram for the receive path DSP circuitry 154A for the system-side line-isolation IC 100 of combined modem and line-isolation system 150 according to the present invention. DSP circuitry 154A includes a digital decimation filter 402, a modem processor 404, and a multiplexer 406. The data 316 entering the receive path DSP circuitry 154A will be in a digital pulse density modulated data format from an analog-to-digital converter, for example ADC 312 or ADC 506. The digital decimation filter 402 converts this digital pulse density modulated data into, for example, pulse code modulated (PCM) data 410. The modem processor 404 may process this PCM data to produce modem data 414. Depending on the programmable control signal 412 applied to the MUX 406, output data 314 from the DSP 154A will either be raw digital PCM data 410 or processed modem data 414.

FIG. 4C is a block diagram for the transmit DSP path circuitry 154B for the system-side line-isolation IC 100 of the modem and line-isolation system according to the present invention. DSP circuitry 154B includes an interpolation filter 450, a digital modulator 452, a modem processor 404, and a multiplexer 454. The data 314 entering the transmit path DSP circuitry 154B will either be raw data, such as PCM data, or modem data provided through the communication interface 106. If data 314 is modem data, the modem processor 404 will convert this modem data to modem PCM data 457. Depending upon the programmable control signal 456 applied to the MUX 454, data 458 will either be raw PCM data 314 or processed modem PCM data 457. PCM data 458 is then processed by the interpolation filter 450 and the digital modulator 452 to produce data 316 that will be in a digital pulse density modulated format. This pulse density modulated data 316 may be output, for example, through the DAC 310 or the DAC 504.

Figure 5:
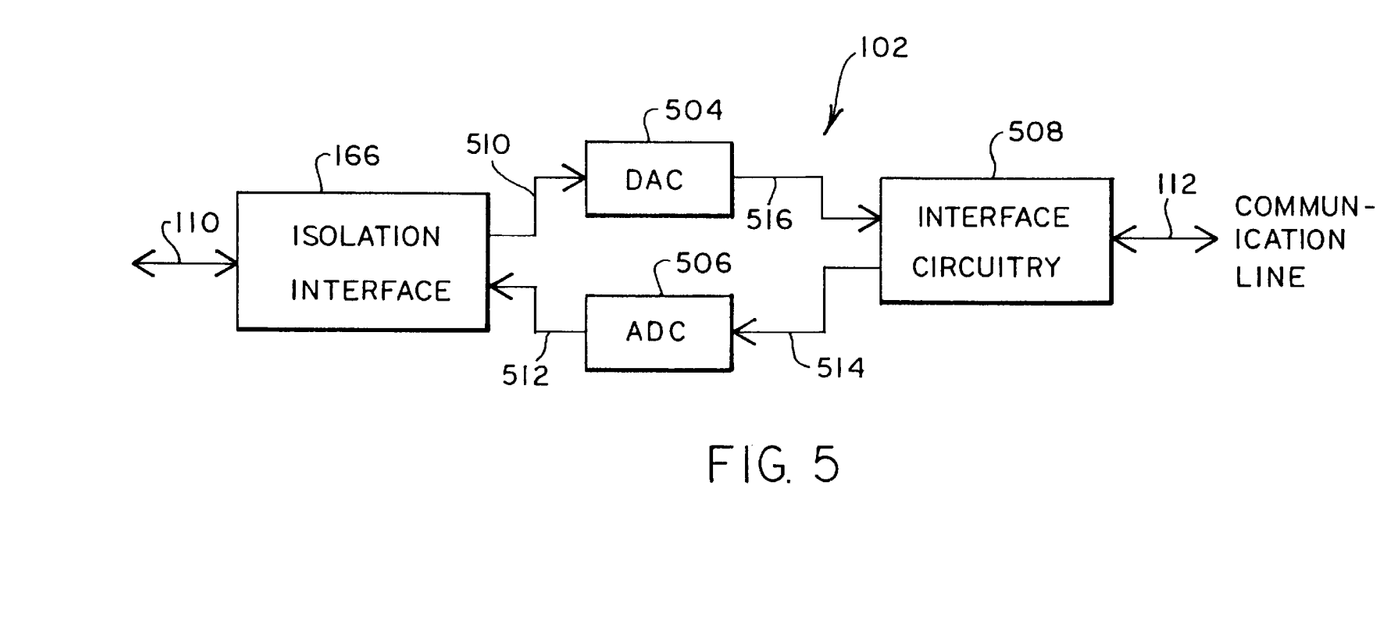
FIG. 5 is a block diagram of an embodiment for the line-side line-isolation integrated circuit of the line-isolation system according to the present invention.

FIG. 5 is a block diagram of an embodiment for the line-side line-isolation IC 102 of combined modem and line-isolation system, according to the present invention. The line-side line-isolation IC 102 includes an isolation interface 166, a DAC 504, an ADC 506 and line interface circuitry 508. The isolation interface receives and sends data through interface 110 across the isolation barrier 104. The interface circuitry 508 sends and receives data across the interface 112 to the communication line. The DAC 504 converts digital pulse density modulated data 510 to analog data 516. The ADC 506 converts analog data 514 to digital pulse density modulated data 512.

As described above with reference to FIGS. 1A and 1B, the external interface 106 may be an asynchronous serial interface. Thus, the UART 156 of the system-side line-isolation IC 100 may be an asynchronous serial receiver transmitter. However even though the UART is an asynchronous serial receiver transmitter, according to the techniques disclosed herein synchronous modem transmission protocols may be implemented through the UART 156. For example, one such type of synchronous modem transmission protocol is the HDLC (high-level data link control) protocol. In the HDLC protocol, data and control information may be framed and is typically transmitted across a synchronous serial or parallel external interface. Thus in a typical prior art approach, information provided on a synchronous serial or parallel external interface is provided in a synchronous manner to HDLC framing circuitry which may be contained within a microcontroller of a modem DSP.

According to the techniques disclosed herein, data and control information of an HDLC protocol may be presented at the TXD and RXD pins through the UART 156 even though the UART 156 may be an asynchronous serial receiver transmitter. Thus, both transmit and receive data transfers of a serial modem protocol may be implemented through an asynchronous serial interface. The HDLC framing may be performed within the microcontroller 151 that is coupled to the UART 156 as shown in FIG. 1B.

Figure 6A:
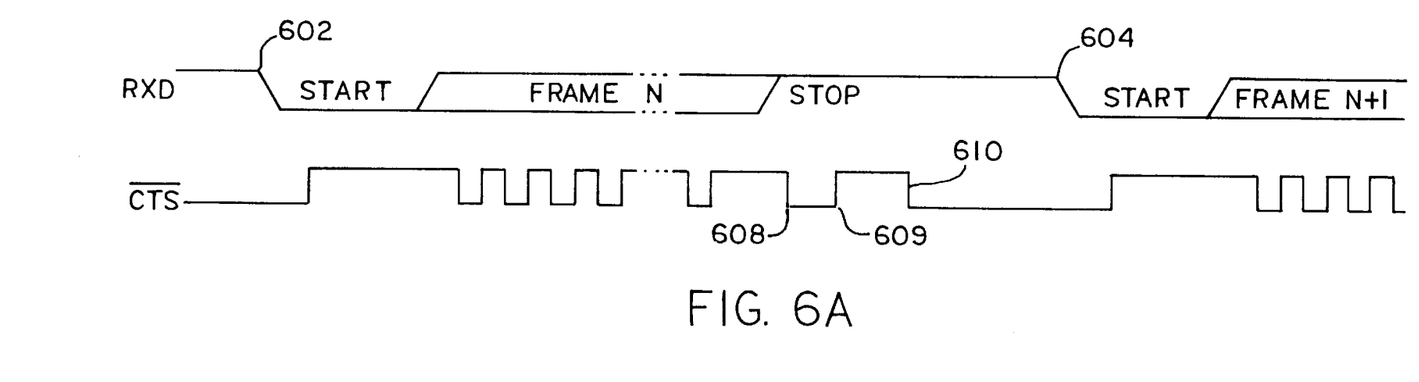
FIGS. 6A and 6B are timing diagrams for utilizing the asynchronous interface disclosed herein to transmit and receive data of a synchronous modem protocol.

The HDLC protocol (or other synchronous protocols) may be selected by setting appropriate flags in registers of the system-side line-isolation IC through use of commands sent through the serial interface during command modes. The external microcontroller or other external interface circuitry (such as microcontroller 202 of FIG. 2A) may now send/receive data across the UART using either the 8-bit word or 9-bit word formats described above. The system-side line-isolation IC 100 may then begin framing data into the HDLC format. When no data is available from the external microcontroller 202, the HDLC flag pattern is sent repeatedly to the communication line 112. When data is available, the system-side line-isolation IC 100 computes the CRC (cyclical redundancy checking) code throughout the frame and the data is sent according to the HDLC protocol. When in the HDLC mode (or other synchronous protocols), data flow control for information sent through the RXD pin to the UART is sent in a similar manner to normal asynchronous flow control in that the clear to send pin CTS indicates when the system-side line-isolation IC 100 is ready to accept information. FIG. 6A is a timing diagram showing the data transfer to the RXD pin during the HDLC mode. As shown in FIG. 6A, the external interface circuitry may provide a frame N beginning at time 602 and a frame N+1 at time 604. At both times 602 and 604, the CTS__line is low to indicate that the system-side line-isolation IC 100 is ready to accept information. When the system-side line-isolation IC is ready to accept additional information (such as time 608) but no word is received by the UART through the RXD pin, the system-side line-isolation IC will recognize. this as an end of frame, change the CTS__signal, and calculate/send the CRC code. Thus, the system-side line-isolation IC determines an end of frame event based upon no frame data being received for some time period. As shown in FIG. 6A, an end of frame may be detected at time 609. HDLC CRC information may then be sent from the system-side line-isolation IC 100 to the communication line 112 after the end of frame has been determined. The CTS__signal will again change at time 610 to again indicate that the system-side line-isolation IC 100 is ready to accept data on the RXD pin.

When transmitting HDLC data (or data in other synchronous protocols) from the asynchronous serial TXD pin to the external interface circuitry (such as microcontroller 202), end of frame information may be indicated to the external interface circuitry in different manners. In one approach, a general purpose control pin may be utilized as an end of frame (EOFR) indicator. For example, as shown in FIG. 1B the GPIO1 pin may be utilized as an EOFR indicator when in the HDLC mode. Thus, the external interface circuitry may monitor the GPIO1 pin to determine when an HDLC end of frame has occurred. In another approach, when 8 data bits are utilized with a 9-bit word format, a ninth control bit may be utilized to indicate an EOFR event. The ninth bit may be the same bit as described above with reference to the escape function. Thus, when receiving data on the RXD pin the ninth bit may indicate the escape function and when transmitting data (in HDLC or other synchronous protocols) on the TXD pin the ninth bit may indicate an EOFR event.

Thus, synchronous information may be sent to or from the asynchronous serial UART to the asynchronous interface by providing synchronous timing information to the external interface circuitry. Exemplary approaches for providing this timing information may include utilizing a separate pin or utilizing additional bits combined with the data words. For example, the CTS pin may indicate timing information when data is being sent to the RXD pin, the GPIO1 pin may indicate timing information when data is being sent from the TXD pin or a designated bit of an n-bit word format may indicate timing information when data is being sent from the TXD pin. The exemplary approaches to provide the timing information are not meant to be limiting and other approaches may be utilized.

Figure 6B:
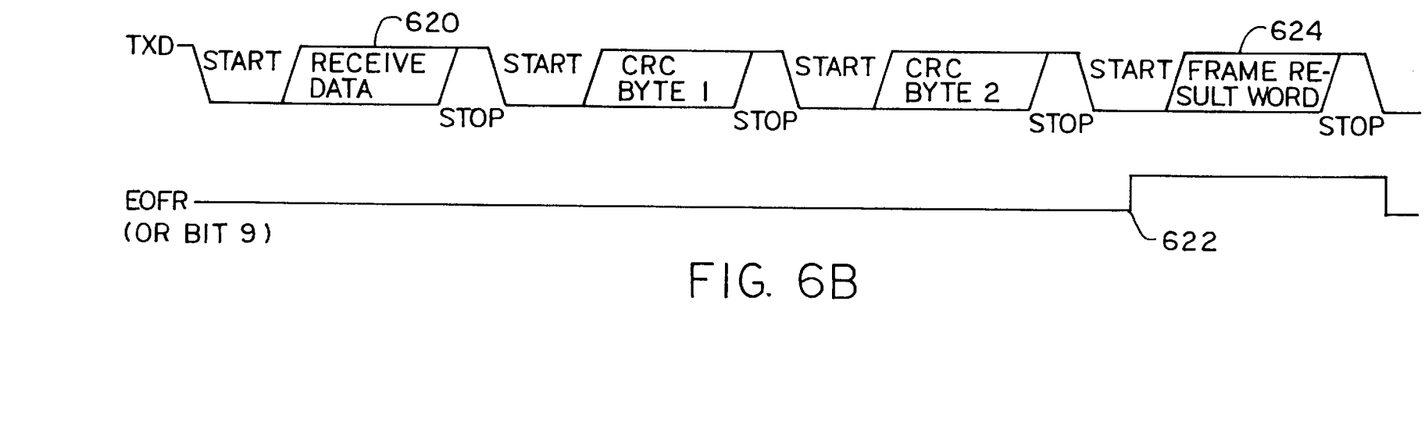

When the system-side line-isolation IC 100 is connected to a communication line 112 (through an isolation barrier 104 and line-side line-isolation IC 102) to receive HDLC information from the line that is to be transmitted on the TXD pin, the system-side line-isolation IC 100 detects the HDLC flag data. When non-flag data is detected, the CRC computing begins and data is sent from the UART to the TXD pin. A timing diagram for transmitting data on the TXD pin is shown in FIG. 6B. The data that the system-side line-isolation IC 100 receives from the communication line 112 that is to be transmitted on the TXD pin is shown at time 620 in FIG. 6B. When the stop flag is received by the system-side line-isolation IC 100 from the communication line 112, the two CRC bytes may transmitted on the TXD pin as shown in FIG. 6B. The EOFR pin or bit 9 of the 9-bit word format (or some other designated bit) may then change to a high state as shown at time 622 to indicate an end of frame event. While the EOFR pin or bit 9 is high, a control word such as a frame result word may be transmitted as indicated at time 624. The frame result word may indicate the occurrence of a completed HDLC frame with correct CRC, the occurrence of a completed HDLC frame with a CRC error, the occurrence of an aborted HDLC frame, or some other framing result. Thus, data may be asynchronously sent on the TXD pin and if the EOFR pin (or bit 9) is low the data is valid frame data and if the EOFR pin (or bit 9) is high the data is frame result data.

Sending the frame result word to the external interface circuitry eliminates the need for the external interface circuitry to read registers within the system-side line-isolation IC to determine the status of the HDLC frames. In addition, it will be noted that the frame result word is sent after an HDLC stop flag is detected, thus, the frame result word is provided over the asynchronous serial interface at a time when no data is required to be transmitted at the TXD pin.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size and arrangement of parts. For example, equivalent elements may be substituted for those illustrated and described herein, and certain features of the invention may be utilized independently of the use of other features, all as would be apparent to one skilled in the art after having the benefit of this description of the invention.

We claim:

1. An integrated modem and line-isolation circuit with modem command mode and data mode control, comprising:

system-side line-isolation circuitry capable of being coupled to an isolation barrier;

digital signal processing (DSP) circuitry integrated with the system-side line-isolation circuitry, the DSP circuitry having a modem processor for modem data and a digital processor for system-side circuitry; and an asynchronous serial communication interface coupled to the DSP circuitry and configured to be coupled to an external system-side device, the asynchronous serial communication interface including a serial input pin configured to receive an M-bit word, wherein M-minus-N bits of the M-bit word are data bits and N-bits of the M-bit word are control bits, the control bits identifying whether the modem processor should process the M-minus-N bits of the M-bit word in command mode or in data mode.

2. The integrated modem and line-isolation circuit of claim 1, wherein the M-bit word is a 9-bit word with 8 bits being for data and 1-bit being for control.

3. The integrated modem and line-isolation circuit of claim 2, wherein the single control bit is the last bit of the 9-bit word received through the serial input pin.

4. The integrated modem and line-isolation circuit of claim 1, wherein the serial input pin also receives a start bit before receiving the M-bit word and a stop bit after receiving the M-bit word.

5. The integrated modem and line-isolation circuit of claim 1, wherein the system-side line-isolation circuitry is capable of sending digital information across the isolation barrier.

6. The integrated modem and line-isolation circuit of claim 5, wherein the isolation barrier utilizes a capacitively isolated barrier.

7. The integrated modem and line-isolation circuit of claim 6, wherein digital information is communication across the capacitively isolated barrier.

8. The integrated modem and line-isolation circuit of claim 1, wherein the digital processor comprises digital filters for digital data received across the isolation barrier from the communication line and a digital modulator for digital data transmitted across the isolation barrier to the communication line.

9. The modem and line-isolation integrated circuit of claim 1, wherein the system-side line-isolation circuitry provides system-side phone line direct access arrangement functionality.

10. A method for controlling whether modem circuitry within an integrated modem and line-isolation circuit operates in command mode or data mode, comprising:

providing an asynchronous serial communication interface coupled to modem circuitry within an integrated modem and line-isolation circuit, the asynchronous serial interface including a serial input pin and being configured to be coupled to an external system-side device;

receiving an M-bit word through the serial input pin;

utilizing N-bits of the M-bit word as control bits; and determining whether the modem circuitry processes M-minus-N bits of the M-bit word in command mode or data mode based upon the state of the N control bits.

11. The method of claim 10, wherein the M-bit word is a 9-bit word with 8 bits being for data and 1-bit being for control.

12. The method of claim 11, wherein the single control bit is the last bit of the 9-bit word received through the serial input pin.

13. The method of claim 11, further comprising receiving a start bit before receiving the M-bit word and receiving a stop bit after receiving the M-bit word.

14. A method for providing modem command mode and data mode control for a modem and line-isolation integrated circuit, comprising:

providing a system-side line-isolation integrated circuit including digital-signal-processing (DSP) circuitry having a modem processor for modem data and a digital processor for system-side circuitry;

providing an asynchronous serial communication interface within the system-side line-isolation integrated circuit configured to be coupled to an external system-side device, the asynchronous serial communication interface including a serial input pin for the system-side line-isolation integrated circuit;

receiving an M-bit word through the serial input pin;

utilizing N-bits of the M-bit word as control bits; and determining whether the modem processor processes M-minus-N bits of the M-bit word in command mode or data mode based upon the state of the N control bits.

15. The method of claim 14, further comprising communicating digital information through an isolation barrier between the system-side line-isolation integrated circuit and a line-side line-isolation integrated circuit.

16. The method of claim 15, wherein the isolation barrier is a capacitively isolated barrier.

17. The method of claim 16, wherein digital information is communication across the capacitively isolated barrier.

18. The method of claim 16, wherein the M-bit word is a 9-bit word with 8 bits being for data and 1-bit being for control.

* * * * *

UNITED STATES PATENT AND TRADEMARK OFFICE
CERTIFICATE OF CORRECTION

PATENT NO. : 6,662,238 B1  Page 1 of 1
DATED : December 9, 2003
INVENTOR(S) : Timothy J. Dupuis and Mitchell Reid It is certified that error appears in the above-identified patent and that said Letters Patent is hereby corrected as shown below:

Column 13,
Line 16, please delete "communication" and replace with -- communicated --.

Column 14,
Line 7, please delete "11" and replace with -- 10 --.
Line 37, please delete "communication" and replace with -- communicated --.
Line 38, please delete "16" and replace with -- 14 --.

Signed and Sealed this

Twenty-fourth Day of February, 2004

JON W. DUDAS
*Acting Director of the United States Patent and Trademark Office*